United States Patent
Kotsinas et al.

Patent Number: 6,085,254
Date of Patent: Jul. 4, 2000

[54] DYNAMIC SIZE ALTERATION OF MEMORY FILES

[75] Inventors: Alexander Kotsinas, Stockholm, Sweden; Naresh Rajasingham, Victoria, Australia

[73] Assignee: Telefonaktiebolaget LM Ericsson (publ), Stockholm, Sweden

[21] Appl. No.: 09/058,364

[22] Filed: Apr. 10, 1998

[51] Int. Cl.[7] .................................................. G06F 15/173
[52] U.S. Cl. ........................ 709/235; 709/224; 707/10; 707/205; 711/171; 370/367
[58] Field of Search ............................. 707/10, 101, 205; 395/200.65, 200.54, 200.42; 370/367, 376; 709/220, 224, 235; 711/171

[56] References Cited

U.S. PATENT DOCUMENTS

| 4,980,822 | 12/1990 | Brantley, Jr. et al. | 364/200 |
|---|---|---|---|
| 5,163,046 | 11/1992 | Hahne et al. | 370/79 |
| 5,313,582 | 5/1994 | Hendel et al. | 395/250 |
| 5,541,912 | 7/1996 | Choudhury et al. | 370/17 |
| 5,600,820 | 2/1997 | Johnston | 395/497.02 |
| 5,668,809 | 9/1997 | Rostoker et al. | 370/392 |

FOREIGN PATENT DOCUMENTS

| 0 531 573 A1 | 3/1993 | European Pat. Off. |
| 197 28192 A1 | 1/1999 | Germany. |
| 3-217960 | 9/1991 | Japan. |
| WO 96/05705 | 2/1996 | WIPO. |

OTHER PUBLICATIONS

Standard Search Report for RS 101829 US Completed on Mar. 5, 1999, Mar 3, 1999.

*Primary Examiner*—Jean R. Homere
*Attorney, Agent, or Firm*—Jenkens & Gilchrist, P.C.

[57] ABSTRACT

A method and system for use primarily, but not exclusively, in digital communications switching systems are disclosed, in which the size of traffic-sensitive (temporary) size-alterable memory files is automatically increased when file congestion occurs. Preferably, the logical size of the files is increased, which can be accomplished much faster than by conventional approaches, because there is no need to make physical memory store reallocations. Additionally, an operator and/or an application program can dynamically control the utilization of traffic-insensitive (permanent) size-alterable files.

29 Claims, 2 Drawing Sheets

DYNAMIC SIZE ALTERATION OF MEMORY FILES

BACKGROUND OF THE INVENTION

1. Technical Field of the Invention

The present invention relates in general to the telecommunications field and, in particular, to a method and system for dynamically dimensioning size-alterable memory files for use primarily, but not exclusively, in communications switching systems.

2. Description of Related Art

Size-alterable data files are used in communications networks to improve memory utilization, central processor efficiency, and traffic throughput. For example, in the AXE 10 Digital Switching Systems manufactured for use in communication networks by Ericsson Telecom AB and Ericsson Radio Systems AB, size-alterable memory files are called "Size Alteration Event" (SAE) files and utilized primarily as dimensionable data files.

Currently, the dimensioning of size-alterable data files in communications switching systems is a static process. In other words, the size of these files are adjusted manually at two points in time: (1) when a system containing a size-alterable memory store is delivered to a customer; and (2) when file utilization indicates that the files should be re-dimensioned. For example, in the AXE 10 Digital Switching Systems, a file supervisor and scanner are used to monitor the systems' central processor memory stores. As such, the initial size of the SAE files to be utilized in an AXE 10 switching system is first estimated based on certain standard values and the customer's expected file utilization. The SAE files are then dimensioned according to those estimates when the system is delivered to the customer. Subsequently, usage counters periodically scan and thus monitor the utilization of the SAE files. A file congestion supervisor detects file congestion for data traffic-sensitive (temporary) SAE files. Given the utilization and congestion information thus provided, the customer can determine if new SAE file sizes are needed, and if so, manually initiate the process of re-dimensioning the pertinent files.

A significant problem with the use of existing file supervisor approaches is that the process of estimating the size of the memory files has become very complex given the increased amount of functionality and services being provided by exchanges, which in turn, has increased the number of size-alterable files being utilized. Consequently, a substantial number of size-alterable memory files are initially either under-dimensioned or over-dimensioned, and some files are even neglected and inadequately dimensioned to start with. This problem leads to inefficient utilization of the memory store, increased central processor load, increased congestion and loss of traffic, and lost revenue for customers due to interrupted or lost calls.

Similarly, a significant problem with the use of existing file scanning approaches is that there is a substantial delay (e.g., up to 30 minutes) between the points in time when the usage counters are scanned and the file utilization information (particularly congestion information) is reported to the system operator. The operator then has to determine which size-alterable files should be re-dimensioned, and manually initiate the process to increase or decrease the size of the pertinent files (a labor-intensive and costly process). Consequently, the period of time that it takes to correct a file congestion problem is much too long, especially for traffic-sensitive size-alterable files (e.g., data files that are seized temporarily by an application program and then released).

Additionally, a significant problem with the use of existing file congestion supervisor approaches is that although file congestion can be detected, the file congestion supervisor provides little or no indication about how big the specific size-alterable files should be to relieve that congestion. Consequently, the system operator has to estimate the new file sizes and then manually initiate the re-dimensioning process for each file. Again, the time it takes to correct a file congestion problem is much too long, especially for traffic-sensitive files. However, as described in detail below, the present invention successfully resolves these problems.

SUMMARY OF THE INVENTION

In accordance with the present invention, a method and system are provided for automatically increasing the size of traffic-sensitive (temporary) size-alterable memory files when file congestion occurs. Additionally, the present invention enables application programs to dynamically control the file size based on the utilization of traffic-insensitive (permanent) size-alterable files.

An important technical advantage of the present invention is that the re-dimensioning of the traffic-sensitive size-alterable files can be accomplished relatively quickly, which minimizes file congestion and central processor load, and increases traffic throughput.

Another important technical advantage of the present invention is that the overall throughput and Quality-of-Service (QoS) of a communications switch can be improved, and the costs to maintain such a switch can be reduced.

Still another important technical advantage of the present invention is that the size of permanent size-alterable files can be increased or decreased dynamically by an application program, or by an operator who can control just when such an increase or decrease should occur.

Yet another important technical advantage of the present invention is that customer revenue losses due to lost calls can be significantly reduced.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
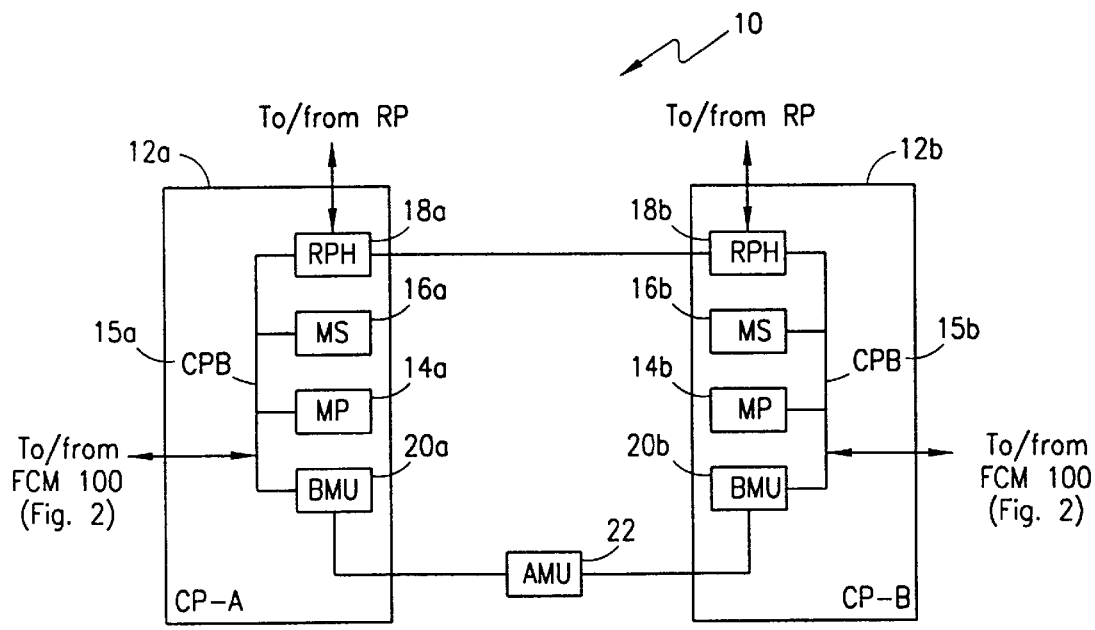
FIG. 1 is a functional block diagram of an exemplary processor subsystem for a communications switching system that can be utilized to dynamically dimension size-alterable memory files, in accordance with a preferred embodiment of the present invention.

The preferred embodiment of the present invention and its advantages are best understood by referring to FIGS. 1–4 of the drawings, like numerals being used for like and corresponding parts of the various drawings.

Essentially, the present invention solves the above-described problems by automatically increasing the size of temporary size-alterable memory files when file congestion occurs. Additionally, the invention enables an operator and/or an application program to dynamically control the utilization of permanent size-alterable memory files.

More specifically, as illustrated below by a preferred, exemplary embodiment of the present invention, when a memory file manager in a communications switch determines that there are no idle records in a size-alterable file (e.g., file congestion has occurred), an application program sends a signal to the file manager in (or associated with) a central processor, which spontaneously increases the logical size of that size-alterable file. Preferably, the logical file size is maintained within the boundaries of the physical memory area allocated for that file. The primary advantages of this approach are that the logical size increase can be accomplished relatively quickly since no physical memory reallocation is needed, which minimizes traffic congestion in the switching system and central processor load, and thereby increases traffic throughput.

Additionally, application programs (e.g., hardware- or subscriber-related applications) or an operator can direct the switching system's central processor to dynamically increase or decrease the size of permanent or static size-alterable files. For example, once the initial dimensioning parameters are configured for the system, at run-time the system determines what the new file size requirements are. The files that require a physical reallocation of memory are queued in an "Action List". Using a single command operation, the operator can execute all of the tasks in the list (including the reallocations). As such, an operator can control just when such an increase or decrease should occur. The primary advantages of this approach are that the overall throughput and QoS of the switching system are improved, and the costs to maintain the switching system are reduced.

DEFINITIONS

Congestion event—Event encountered when an attempt to seize an individual data file fails because there are no idle individuals.
Logical data file size—Number of records of a data file that the file "owner" application has access to.
Number of Individuals (NI)—The size of a Size Alteration Event.
Number of Individuals Expansion (NIE) size—Size by which the Number of Individuals for the Size Alteration Event will be increased by a function for a logical file size increase.
Number of Individuals Reserved (NIR)—The size of a Size Alteration Event that is reserved for automatic size increase.
Number of Individuals Used (NIU)—The number of individuals in a Size Alteration Event being used by the file "owner" program. A measure of the current utilization of a Size Alteration Event.
Physical data file size (NRR)—The number of records of a data file physically allocated in the data store.
Size Alteration Action List—A list of Size Alteration Events pending size alteration.
Size Alteration Event (SAE)—The data files whose size can be altered, which are grouped into system-defined local and global events. A local event affects one or more data files in one block only, and a global event affects one or more data files in one or more blocks. For example, in the Ericsson AXE 10 Digital Switching System, functions allocated to certain subsystems are divided into individual function blocks. Each function block can access its own program and data areas in software units.

FIG. 1 is a functional block diagram of an exemplary processor subsystem 10 for a communications switching system that can be utilized to dynamically dimension size-alterable memory files, in accordance with a preferred embodiment of the present invention. The processor subsystem 10 shown can be used in a number of communications network applications, such as for example, a Local Exchange, National Transit/Tandem Exchange, International Exchange, Operator Exchange, Mobile Telephony Exchange, Combined Exchange, and Intelligent Network (IN) applications (e.g., Signalling Transfer Point or STP, Service Switching Point or SSP, Service Control Point or SCP, Service Switching and Control Point or SSCP, etc.). As such, the exemplary processor subsystem 10 is shown for illustrative purposes only, and the present invention is not limited to the specific structure shown. More broadly, the present invention includes a system and method that can be used for dynamically dimensioning size-alterable memory files in any telecommunications processing environment.

Referring to the exemplary embodiment shown in FIG. 1 (which is for illustrative purposes only), for improved fault-tolerance and redundancy purposes in a communications switch, a processor subsystem 10 can include duplicate central processors CP-A (12a) and CP-B (12b), which operate in a parallel synchronous mode and are connected so that data can be transferred between them. Each central processor 12a and 12b includes a main processor 14a and 14b connected by a respective central processor bus 15a and 15b to a main memory store 16a and 16b. For this embodiment, each main processor 14a and 14b independently performs arithmetical and logical operations. Each main memory store 16a and 16b contains both programs and data. All or a portion of the data can be size-alterable files. Each central processor 12a and 12b also includes a respective regional processor handler 18a and 18b for handling signals to and from regional processors (not explicitly shown). A bus access matching and updating unit 20a and 20b controls the data flow in the respective central processor bus 15a and 15b, and transfers of data between the central processors 12a and 12b. An automatic maintenance unit 22 initiates testing of the central processors when hardware faults are detected.

Figure 2:
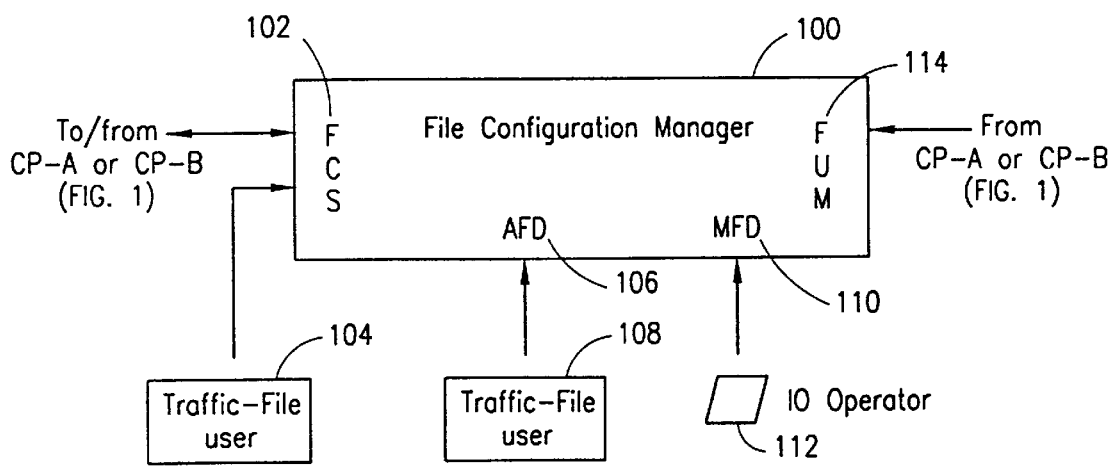
FIG. 2 is a functional block diagram of an exemplary file configuration manager that can be used to dynamically dimension size-alterable memory files, in accordance with the present invention.
Figure 3:
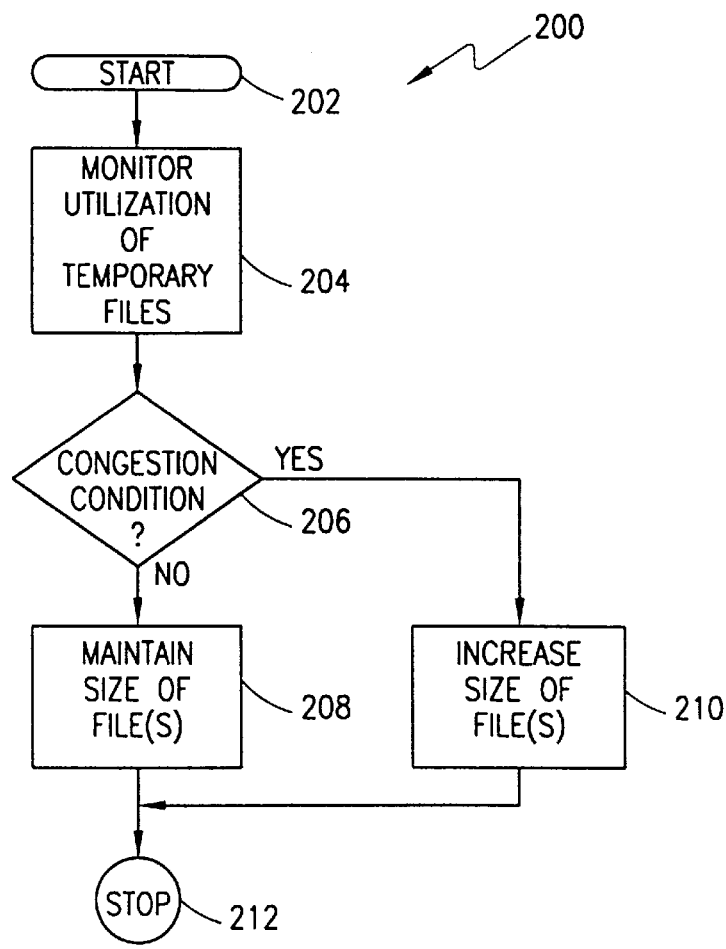
FIG. 3 is a method that can be used to determine when file congestion is about to occur, in accordance with the present invention.

FIG. 2 is a functional block diagram of an exemplary file configuration manager 100 that can be used to dynamically dimension size-alterable memory files, in accordance with the present invention. For example, such memory files can be size-alterable files included in each of the main memory stores 16a and 16b of the switching subsystem 10 shown in FIG. 1, in accordance with the preferred embodiment of the present invention. The file configuration manager 100 shown in FIG. 2 can be used to automatically monitor and dimension a plurality of size-alterable files in any existing communications switching system. For this embodiment, the size-alterable files being utilized can be temporary and/or permanent files.

In general, the temporary size-alterable files included can be data files that are seized and utilized temporarily by an application program, such as for example, traffic-sensitive size-alterable data files in a central processor main memory store, or a dynamic buffer's size-alterable data files. The permanent size-alterable files included can be files that contain permanent data, such as for example, hardware-related or subscriber-related size-alterable files. Typically, in a communications switching environment, these types of permanent size-alterable files are seized and utilized by an operation and maintenance (O&M) application.

For this exemplary embodiment, the file configuration manager 100 can include a file congestion supervisor 102, which detects congestion in traffic-sensitive size-alterable files and initiates appropriate measures to remedy the congestion. In accordance with the invention, the preferred method used to remedy congestion in traffic-sensitive size-alterable files is to increase the size of those files. The application that "owns" or utilizes traffic-sensitive (temporary) size-alterable files ("owner" application) can report to the file congestion supervisor 102 (via the central processor 12a or 12b) when congestion is about to occur (no idle records) or has been detected in any of those files. Alternatively, a File Utilization Measurement (FUM) function 114 can monitor the utilization of the size-alterable files. As such, if the file congestion supervisor 102 determines that there are no idle records in a size-alterable file, the file congestion supervisor assumes that file congestion has occurred.

In accordance with the present invention, there are a number of methods that can be used to detect impending congestion in temporary size-alterable files. As mentioned above, referring to FIG. 3, a preferred method 200 is provided to determine when file congestion has occurred. For this embodiment, at step 204, the file congestion supervisor 102 monitors (via a processor 12a or 12b) the temporary size-alterable files in memory store 16a or 16b. At step 206, when the file congestion supervisor 102 detects an impending congestion (e.g., determines that there are no idle records) in a temporary size-alterable file, the file congestion supervisor 102 assumes that congestion is about to occur for that file. At step 210, the file congestion supervisor 102 then initiates action (described below) to increase the size of the pertinent temporary file.

In accordance with a second embodiment of the present invention, another method to detect impending congestion is to determine the probability that congestion will occur. For example, at step 204, an "owner" application (traffic-sensitive file user program) 104 can utilize counters to detect congestion in temporary data files. One counter can provide the total number of failed seizures, $sf_{tot}$, (i.e., the application attempted but failed to seize temporary data files). Another counter can provide the total number of file seizure attempts made, $sa_{tot}$. At step 206, the application can calculate a probability of congestion from the total number of failed seizures divided by the total number of seizure attempts made, or $sf_{tot}/sa_{tot}$. For this embodiment, the "owner" application 104 reports the derived probability of congestion value to the file congestion supervisor 102 (via a central processor 12a or 12b). The file congestion supervisor 102 compares the reported probability of congestion value with a predetermined congestion value (e.g., "acceptable" congestion). If the reported value is greater than or equal to the predetermined congestion value, at step 210, the file congestion supervisor 102 initiates action (described below) to increase the size of the pertinent temporary file(s).

In accordance with a third embodiment of the present invention, still another method that can be used to detect congestion in temporary size-alterable files is to monitor (step 204) the number of file congestions that occur (e.g., failed file seizure attempts). At step 206, when the number of congestions is greater than or equal to a predetermined "default" congestion value (e.g., 1–2 congestions have occurred), the file congestion supervisor 102 initiates action (described below), to increase the size of the pertinent files (step 210).

For each of the above-described embodiments, at step 210, the file congestion supervisor 102 directs the Automatic File Dimensioner (AFD) 106 to increase the size of the pertinent temporary size-alterable files. For the preferred embodiment, the AFD 106 can be a dynamic software routine that can spontaneously dimension (increase or decrease the size of) pertinent size-alterable files. The dimensioning of these files can be made at the request of the file congestion supervisor 102 or an "owner" application program 104. Preferably, for file increases, the size of a traffic-sensitive file can be limited to its physical file size. However, this physical limitation is for design purposes only, and is not intended to so limit the scope of the invention.

Requests made to the AFD 106 for automatic file dimensioning can specify certain parameters to be used when the size of a file is to be increased (or decreased). One such AFD parameter is the file type (e.g., traffic-sensitive or traffic-insensitive file). Accordingly, the AFD 106 can use the file type to determine how rapidly to increase (or decrease) the size of that file. In accordance with the present invention, a fast-file-increase method (described below) is used by the AFD 106 to rapidly increase the size of traffic-sensitive size-alterable files and thereby eliminate, or at least minimize the number of, congested files for a high central processor (e.g., 12a or 12b) load.

A second AFD parameter is the file expansion factor to use for a file. The file expansion factor can be used by the AFD 106 to determine a new file size in response to a request for a file size increase. For example, the file expansion factor (preferably used to eliminate or at least minimize traffic-sensitive file congestion) for a file can be calculated based on a relationship between a number of congested files and a size increase to be performed for that file.

Alternatively, a file shrink factor is used to determine a new file size in response to a request for a file size decrease. In accordance with the present invention, the file expansion factor and file shrink factor are preferably selected to minimize the reallocation of the memory files.

As mentioned above, the fast-file-increase method used by the AFD 106 to increase the size of traffic-sensitive size-alterable files can eliminate or minimize file congestion, and thereby substantially improve the QoS of the switching system. As such, the AFD 106 employs the fast-file-increase method to compare a predetermined threshold file size with the physical size of the size-alterable file to be increased. For the preferred embodiment, the predetermined threshold file size is defined as the logical file size based on the number of individuals (NI). The physical file size is based on the number of records (NRR) in a file. As such, the AFD 106 employs the fast-file-increase method to allocate a physical file size that is larger than the logical file size, by a multiple (n) of the file expansion factor. A relationship between the physical file size and logical file size of a size-alterable file can be expressed as: physical_size(NRR)=logical_size(NI)+n*file_expansion_factor. For this exemplary embodiment, a 1:1 relationship between NRR and NI can be assumed.

Figure 4:
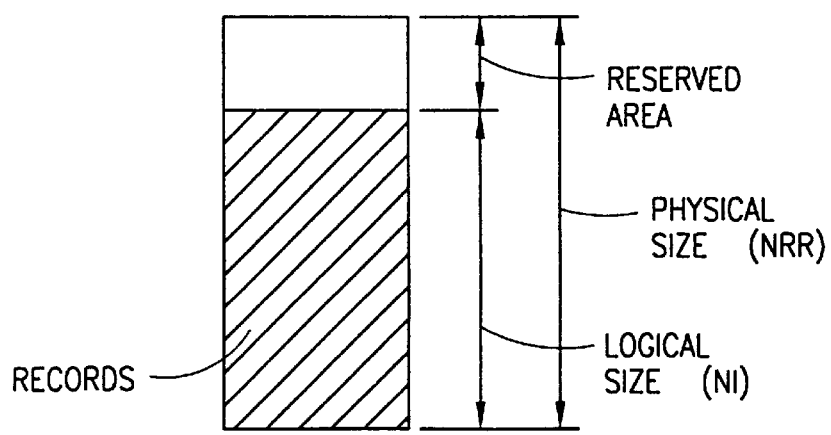
FIG. 4 is a diagram that illustrates an exemplary structure for a size-alterable file.

FIG. 4 is a diagram that illustrates an exemplary structure for a size-alterable file. In response to a request to increase the size of a traffic-sensitive size-alterable file using the fast-file-increase method (e.g., step 210 in FIG. 3), the AFD 106 immediately increases the logical size (NI) of the pertinent file. Notably, the present invention's preferable use of the logical memory store allows the file size increases to be made much faster and less costly from a central processor load point of view, because there is no need to make physical memory stores reallocations. However, if needed in an operational environment, the AFD 106 can also increase the physical size (NRR) of the pertinent file. This approach of increasing the logical file size reduces the execution time needed for the central processor 12a or 12b to perform the increase, and thereby minimizes the number of file congestions that can occur. Also, this approach does not cause an increase in processing/idle central processor load or restart time, because initially the logical file size does not include the reserved area of the file. Furthermore, the predetermined threshold level can be controlled by the file configuration manager 100, and therefore, does not impact the traffic capacity of the central processor (e.g., 12a or 12b). Preferably, for design purposes, the increase in file size is accomplished if the current logical size of the pertinent file is exceeded.

The "File Size Relationship" (FR) is defined as the relationship between the Number of Individuals of an SAE and the logical file size of a data file. Preferably, this relationship is defined in the data file "owner" blocks for all data files in an SAE. The FR can be further defined as: logical_data_file_size=NI * (x+z) or NI/(x+z); and physical_data_file_size=(NI+NIR) * (x+z) or (NI+NIR)/(x+z), where "x" is the divergence of the files, and "z" is additional divergence of the files. The logical size of the data file is calculated based on the Number of Individuals (NI) set for the type SAE involved. For example, the SAE involved can be a congestion event-controlled SAE (at least one block in the SAE requests a size increase when congestion is detected), a program-defined SAE (an application block requests the SAE with a specified data file size), or a manually-controlled SAE (the SAEs can be size-altered per an operator's command).

A congestion event-controlled size alteration provides control to the data file "owner" block to request a size increase when congestion is detected (e.g., during a data file seizure). The data file "owner" block can control when to request a size increase for a data file that is part of an SAE. This function separates the data file size into a logical and physical size. The data file "owner" block is given access only to the records in the logical size part. The logical size of the data file is calculated based on the NIs set for the SAE involved. The physical size of the data file is calculated based on an addition of the NIs and NIRs. The NIs and NIEs for an SAE can be set by operator commands. For the preferred embodiment, when the NIE size is set by such a command for a congestion event-controlled increase, the NIR(s) for an SAE involved is(are) set to four times the NIE size.

In accordance with the present invention, this separation of the logical and physical areas of a data file allows the NIs for an SAE to be increased within the physical file size, without the need to allocate the data store. When the "owner" block for a data file requests an increase responsive to the detection of a congestion event, the NI is preferably increased by the NIE size, and the NIR is decreased by the NIE size. If the physical file size limit is reached, that particular SAE is inserted as an action item in the Size Alteration Action List (ultimately to be executed a directed), with the NIR equal to four times the NIE size.

If the NIE size is equal to zero, then the logical and physical sizes of the data file are equal. As such, when the "owner" block for the data file encounters data file congestion at seizure, the NIE size is preferably set to 1% of the NIs for that SAE. That SAE is inserted into the Size Alteration Action List (for subsequent execution), with the NIR set equal to four times the NIE size, and the NIs to be increased by the NIE size.

For a congestion event-controlled type SAE, preferably at least one block in the SAE requests a size increase when a congestion event is detected. Also, all blocks that reference that SAE are updated with an SAE declaration statement and recompiled.

For the preferred embodiment, file dimensioning of traffic-insensitive size-alterable files (e.g., static or permanent files) is controlled by the application programs that "own" the pertinent files. Preferably, the fast-file-increase method is not used for traffic-insensitive files. For example, an "exchange data definition" command can be issued by an "owner" application (e.g., other user 108) to the AFD 106 to acquire more file space for "owned" traffic-insensitive files. An "exchange data removal" command can be issued by the "owner" application (108) to the AFD 106 to decrease the size of a traffic-insensitive size-alterable file after data has been removed from that file. For this embodiment, a new file size for a traffic-insensitive size-alterable file can be calculated by the AFD 106, based on the file expansion factor assigned by the program "owner" of the pertinent file. Preferably, the "owner" program (108) provides a predetermined threshold file usage value to the AFD 106. The AFD 106 automatically initiates a file size increase when the usage of a traffic-insensitive size-alterable file exceeds the predetermined threshold value. The predetermined threshold value can be determined based on specific design constraints placed by an operator on the "owner" application.

A program-defined size alteration provides control to an application block to request a size increase or decrease for an SAE. Preferably, the program-defined size alteration functions to insert the SAE involved in the Size Alteration Action List (for subsequent execution). Once the requested size alteration has been completed, the application block is informed. However, the application block can cancel a size alteration request entered in the Size Alteration Action List. When an SAE is inserted into the Size Alteration Action List, that function can set an alarm (e.g., Size alteration_file size change_pending), which indicates that a physical data size alteration is required. Preferably, the Size Alteration Action List comprises at least the following information: (1) SAE identity (e.g., the size alteration case for a global SAE, and the size alteration case plus the block number involved, for a local SAE); (2) File size action required (e.g., increase or decrease); and (3) The NIs and NIRs to be set for the SAE. In a manual operational mode, the size alterations requested by application programs that require physical data file size alterations are stored in the Size Alteration Action List. In an automatic operational mode, the size alterations requested by application programs that require physical data file size alterations are stored in the Size Alteration Action List and executed in order (e.g., first in-first out). An SAE is deleted from the Action List once it has been executed. The alarm (size alteration_file size change_pending) is reset when the Action List is empty.

For the exemplary embodiment shown in FIG. 2, the file configuration manager 100 also includes a manual file dimensioning (MFD) function 110, which can be controlled by an operator (112) to initiate (via a central processor 12a or 12b) an increase or decrease of permanent size-alterable files. The FUM function 114 is associated with the MFD function 110, and can be used by an operator to manually size a file. The FUM function 114 makes measurements by reading the file utilization counter value from the application.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer implemented method for dimensioning a plurality of size-alterable memory files in a telecommunications environment, comprising the steps of:

monitoring a utilization of said plurality of said size-alterable memory files;

determining if at least one of said plurality of said size-alterable memory files has met a predetermined congestion condition, the predetermined congestion condition comprising at least one failed file seizure attempt; and if so, increasing a size of said at least one of said size-alterable memory files.

2. The method of claim 1, wherein the increasing step comprises increasing a logical size of said at least one of said size-alterable memory files.

3. The method of claim 1, wherein said plurality of said size-alterable memory files comprises a plurality of temporary data files.

4. The method of claim 1, wherein said plurality of said size-alterable memory files comprises a plurality of traffic-sensitive size-alterable memory files.

5. The method of claim 1, wherein said plurality of said size-alterable memory files comprises a plurality of Size Alteration Event files.

6. The method of claim 1, wherein said predetermined congestion condition further comprises a condition wherein there are substantially no idle records in said at least one of said plurality of size-alterable memory files.

7. The method of claim 1, wherein said predetermined congestion condition comprises a probability of impending congestion.

8. The method of claim 7, wherein said probability of impending congestion comprises a total number of the failed file seizure attempts divided by a total number of seizure attempts.

9. The method of claim 1, wherein said predetermined congestion condition comprises a threshold number of the failed file seizure attempts.

10. The method of claim 1, wherein the increasing step is initiated by an Automatic File Dimensioner application.

11. The method of claim 1, wherein the increasing step comprises an owner application increasing a size of said at least one of said size-alterable memory files.

12. The method of claim 11, wherein said owner application increases a size of at least one permanent size-alterable memory file.

13. The method of claim 1, wherein the increasing step comprises an operator increasing a size of said at least one of said size-alterable memory files.

14. A system for improving utilization of a plurality of size-alterable memory files in a telecommunications environment, comprising:

a processor;

a memory store associated with said processor, said memory store including said plurality of said size-alterable memory files; and a file manager coupled to said processor, said file manager operable to:

monitor said utilization of said plurality of said size-alterable memory files;

determine if at least one of said plurality of said size-alterable memory files has met a predetermined congestion condition, the predetermined congestion condition comprising at least one failed file seizure attempt; and if so, increase a size of said at least one of said size-alterable memory files.

15. The system of claim 14, wherein the increasing operation comprises increasing a logical size of said at least one of said size-alterable memory files.

16. The system of claim 14, wherein said plurality of said size-alterable memory files comprises a plurality of temporary data files.

17. The system of claim 14, wherein said plurality of said size-alterable memory files comprises a plurality of traffic-sensitive size-alterable memory files.

18. The system of claim 14, wherein said plurality of said size-alterable memory files comprises a plurality of Size Alteration Event files.

19. The system of claim 14, wherein said predetermined congestion condition further comprises a condition wherein there are substantially no idle records in said at least one of said plurality of size-alterable memory files.

20. The system of claim 14, wherein said predetermined congestion condition comprises a probability of impending congestion.

21. The system of claim 20, wherein said probability of impending congestion comprises a total number of the failed file seizure attempts divided by a total number of seizure attempts.

22. The system of claim 20, wherein said predetermined congestion condition comprises a threshold number of the failed file seizure attempts.

23. The system of claim 14, wherein the increasing operation is initiated by an Automatic File Dimensioner application.

24. The system of claim 14, wherein the increasing operation comprises an owner application increasing a size of said at least one of said size-alterable memory files.

25. The system of claim 24, wherein said owner a application increases a size of a t least one permanent size-alterable memory file.

26. The system of claim 14, wherein the increasing operation comprises an operator increasing a size of said at least one of said size-alterable memory files.

27. The system of claim 14, wherein said processor comprises a main processor in a communications switching system.

28. A computer implemented method for dimensioning a plurality of size-alterable memory files in a telecommunications environment, comprising the steps of:

monitoring a utilization of said plurality of said size-alterable memory files;

determining if at least one of said plurality of said size-alterable memory files has met a probability of impending congestion, the probability of impending congestion comprising a total number of failed file seizures divided by a total number of seizure attempts; and if so, increasing a size of said at least one of said size-alterable memory files.

29. A system for improving utilization of a plurality of size-alterable memory files in a telecommunications environment, comprising:

a processor;

a memory store associated with said processor, said memory store including said plurality of said size-alterable memory files; and a file manager coupled to said processor, said file manager operable to:

monitor said utilization of said plurality of said size-alterable memory files;

determine if at least one of said plurality of said size-alterable memory files has met a probability of impending congestion, the probability of impending congestion comprising a total number of failed file seizures divided by a total number of seizure attempts; and if so, increase a size of said at least one of said size-alterable memory files.

* * * * *

UNITED STATES PATENT AND TRADEMARK OFFICE
CERTIFICATE OF CORRECTION

PATENT NO. : 6,085,254
DATED : July 4, 2000
INVENTOR(S) : Kotsinas et al.

It is certified that error appears in the above-identified patent and that said Letters Patent is hereby corrected as shown below:

Column 10, line 25    Delete "a"

Column 10, line 26    Replace "a t"
                      With --at--

Signed and Sealed this

Twenty-second Day of May, 2001

*Attest:*

NICHOLAS P. GODICI

*Attesting Officer*    *Acting Director of the United States Patent and Trademark Office*